United States Patent
Cowan et al.

(10) Patent No.: US 12,326,033 B2
(45) Date of Patent: Jun. 10, 2025

(54) TERMINAL BREACH PROTECTION METHODS AND DEVICES

(71) Applicant: NCR Atleos Corporation, Atlanta, GA (US)

(72) Inventors: Robbie Charles Aidan Cowan, Edinburgh (GB); Stewart James Herd, Kinross (GB); Mark Alden Lee, Dalgety Bay (GB); Rennie McIntosh, Dunfermline (GB)

(73) Assignee: NCR Atleos Corporation, Atlanta, GA (US)

( * ) Notice: Subject to any disclaimer, the term of this patent is extended or adjusted under 35 U.S.C. 154(b) by 1050 days.

(21) Appl. No.: 16/518,709

(22) Filed: Jul. 22, 2019

(65) Prior Publication Data
US 2021/0025217 A1    Jan. 28, 2021

(51) Int. Cl.
*E05G 1/026* (2006.01)
*G07F 19/00* (2006.01)

(52) U.S. Cl.
CPC .......... *E05G 1/026* (2013.01); *G07F 19/205* (2013.01)

(58) Field of Classification Search
CPC ...... G07F 19/20; G07F 19/205; G07F 19/207; E05G 1/026; E05G 1/06; E05G 1/08; E05G 7/001
See application file for complete search history.

(56) References Cited

U.S. PATENT DOCUMENTS

| | | | | |
|---|---|---|---|---|
| 3,762,634 | A * | 10/1973 | Leipelt | E05G 7/001 232/60 |
| 5,284,101 | A * | 2/1994 | Oder | E05G 7/001 109/66 |
| 6,516,468 | B2 * | 2/2003 | Minamishin | G07F 19/201 222/2 |
| 6,896,181 | B2 * | 5/2005 | Utz | G07F 19/202 902/8 |
| 9,127,495 | B2 * | 9/2015 | Romero | G07F 19/20 |
| 9,805,559 | B2 * | 10/2017 | Kim | G07F 19/205 |
| 11,380,156 | B2 * | 7/2022 | Mertin | G07F 7/00 |
| 2002/0026754 | A1 * | 3/2002 | Acketts | G07F 19/20 52/79.9 |
| 2009/0314921 | A1 * | 12/2009 | Gould | G07F 19/205 248/636 |

(Continued)

FOREIGN PATENT DOCUMENTS

| | | | | |
|---|---|---|---|---|
| EP | 1260948 A1 * | 11/2002 | ............ | G07F 19/20 |
| GB | 2150955 A  * | 7/1985 | ............... | E05G 1/00 |

(Continued)

*Primary Examiner* — Kristina R Fulton
*Assistant Examiner* — Noah Horowitz
(74) *Attorney, Agent, or Firm* — Schwegman Lundberg & Woessner, P.A.

(57) ABSTRACT

Various embodiments herein each include at least one of devices, methods, and assemblies for terminal breach protection. Some such embodiments may be deployed to prevent insertion of implements, such as hooks and wedges, within a terminal, such as an ATM or SSCO, that may be used to apply sudden, sharp pulling forces to safe doors to enable access to currency stored therein. Some such embodiments also or alternatively include baseplates that at least partially absorb such sudden, sharp pulling forces in a direction from which they are applied in such terminal breaching attempts.

15 Claims, 9 Drawing Sheets

(56) References Cited

U.S. PATENT DOCUMENTS

| | | | |
|---|---|---|---|
| 2014/0048594 A1* | 2/2014 | Kovacs | G07D 11/26 |
| | | | 312/212 |
| 2016/0076296 A1* | 3/2016 | Tavares De Pinho | G07F 19/20 |
| | | | 109/76 |
| 2021/0166531 A1* | 6/2021 | Neufeld | F16B 5/0614 |

FOREIGN PATENT DOCUMENTS

| | | | |
|---|---|---|---|
| KR | 20070118379 A | * | 7/2005 |
| KR | 20190125079 A | * | 11/2006 |
| KR | 20060117403 A | * | 12/2007 |
| KR | 200390960 Y1 | * | 11/2019 |

* cited by examiner

TERMINAL BREACH PROTECTION METHODS AND DEVICES

BACKGROUND INFORMATION

Self-Service Terminals (SSTs), such as Automated Teller Machines (ATMs) and Self-Service Checkout (SSCO) terminals, generally store currency in a safe for dispensing and for storing received currency and other documents. SSTs can hold large quantities of currency reaching as high as $250,000 and perhaps even more in certain locations. Due to the large currency value, SSTs are targets for attack.

SST attacks have come to include hook or chain mechanisms that are inserted or jammed with force into the SSTs and are used in conjunction with a vehicle to cause a short, high-impact force that can deform SST safe doors. Once a safe door is deformed, the door may be free to open or provide a sufficient opening to remove the safe contents.

SUMMARY

Various embodiments herein each include at least one of devices, methods, and assemblies for terminal breach protection. Some such embodiments may be deployed to prevent insertion of implements, such as hooks and wedges, within a terminal, such as an ATM or SSCO, that may be used to apply sudden, sharp pulling forces to safe doors to enable access to currency stored therein. Some such embodiments also or alternatively include baseplates that at least partially absorb such sudden, sharp pulling forces in a direction from which they are applied in such terminal breaching attempts.

One embodiment includes a terminal with a housing having an opening through which a device is exposed to an outside of the housing and a safe internal to the housing. The terminal also includes a device partially internal to the safe, extending outward therefrom, and exposed through the housing opening to perform at least one of dispensing items from the safe outside of the housing and receiving items from outside the housing and into the safe. This embodiment further includes at least one penetration prevention device (PPD) that reduces gaps between the device and boundaries of the opening to prevent entry of foreign objects within the housing and the safe. By preventing entry of entry of foreign objects, objects such as wedges and hooks are more difficult, if not impossible, to insert, thereby reducing loss from terminal safe breaching attempts.

Another embodiment is a PPD for placement around a device partially internal to a safe of a terminal and extending outward from the safe and exposed through an opening in a housing of the terminal. The PPD in such embodiments includes a first piece to attach to the housing opening and a second piece that attaches inside the safe around the device. In some such embodiments, the first and second pieces fit together while allowing access to the device and filling areas around the device accessible through the housing opening, from an inner surface of the housing to an outer surface of the safe, to prevent entry of foreign objects within the housing and the safe.

Some embodiments also, or alternatively, mitigate such sudden force terminal safe breaching attacks, with a shock absorbing or movement restricting terminal baseplate. A terminal baseplate of some such embodiments includes a top and a bottom plate. The top plate is mounted to the bottom of a terminal and a bottom plate mounted is mounted to a surface where the terminal is deployed. The top and bottom plates are allowed to slide in a direction from which a breach-attempting force is likely to come with the sliding dampened by a movement restricting device, such as one or more springs.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the an to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
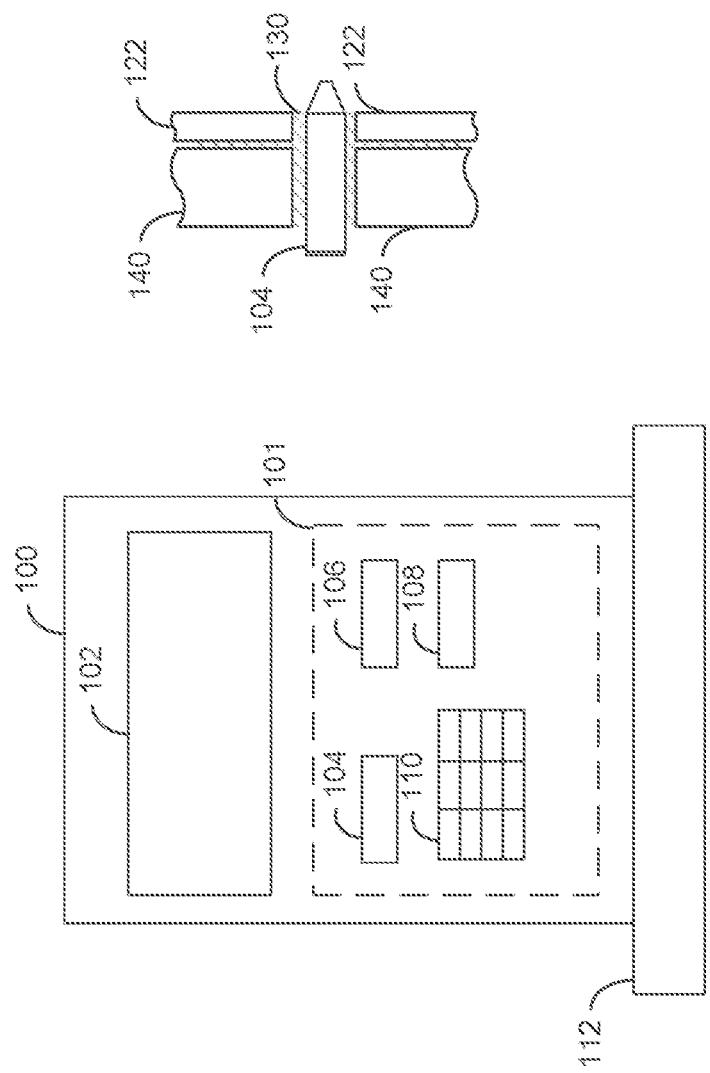
FIG. 1 is a logical block diagram of a terminal, according to an example embodiment.

FIG. 1 is a logical block diagram of a terminal 100, according to an example embodiment. The terminal 100 in various embodiments may be an ATM, a SSCO terminal, or other terminal that includes a sale that holds contents of value. As illustrated however, the terminal 100 is an ATM.

The terminal 100 includes a safe 101 that stores currency for dispensing, a display 102, which may be a touch screen, a currency dispenser 104, a card reader 106, a receipt printer 108, and an encrypting Personal Identification Number (PIN) pad 110. The terminal 100, as illustrated in mounted securely by bolts 114, or other connectors, to a concrete slab 112, which may be formed into a pedestal or other surface.

The various devices of the terminal 100 extend outward from or are exposed by a housing 122 of the terminal 100. Gaps between the housing 122 and the various devices and voids within the housing 122 that may be accessible via these gaps are points where attackers may seek to insert hooks, wedges, and other implements for purposes of breaching the terminal 100 to access contents of the safe 101. Certain devices are not only exposed by or extend though the housing 122, but also extend within the safe, such as the currency dispenser 104. Such devices provide even greater risk for compromising the safe 101 as they provide a path through a door 140 of the safe 101. This path often includes gaps and voids 130 between the housing, the device, such as the currency dispenser 104, and the safe door 140. The goal of such a breaching attempt is to force a hooking device though the gaps and the void 130 to get behind the safe 101 door 140 to allow fora chain attached to the hooking device to be pulled or yanked with great force, such as by a vehicle to open, or at least deform, the safe 101 door 140 allowing access to the sale 101 contents.

Figure 2:
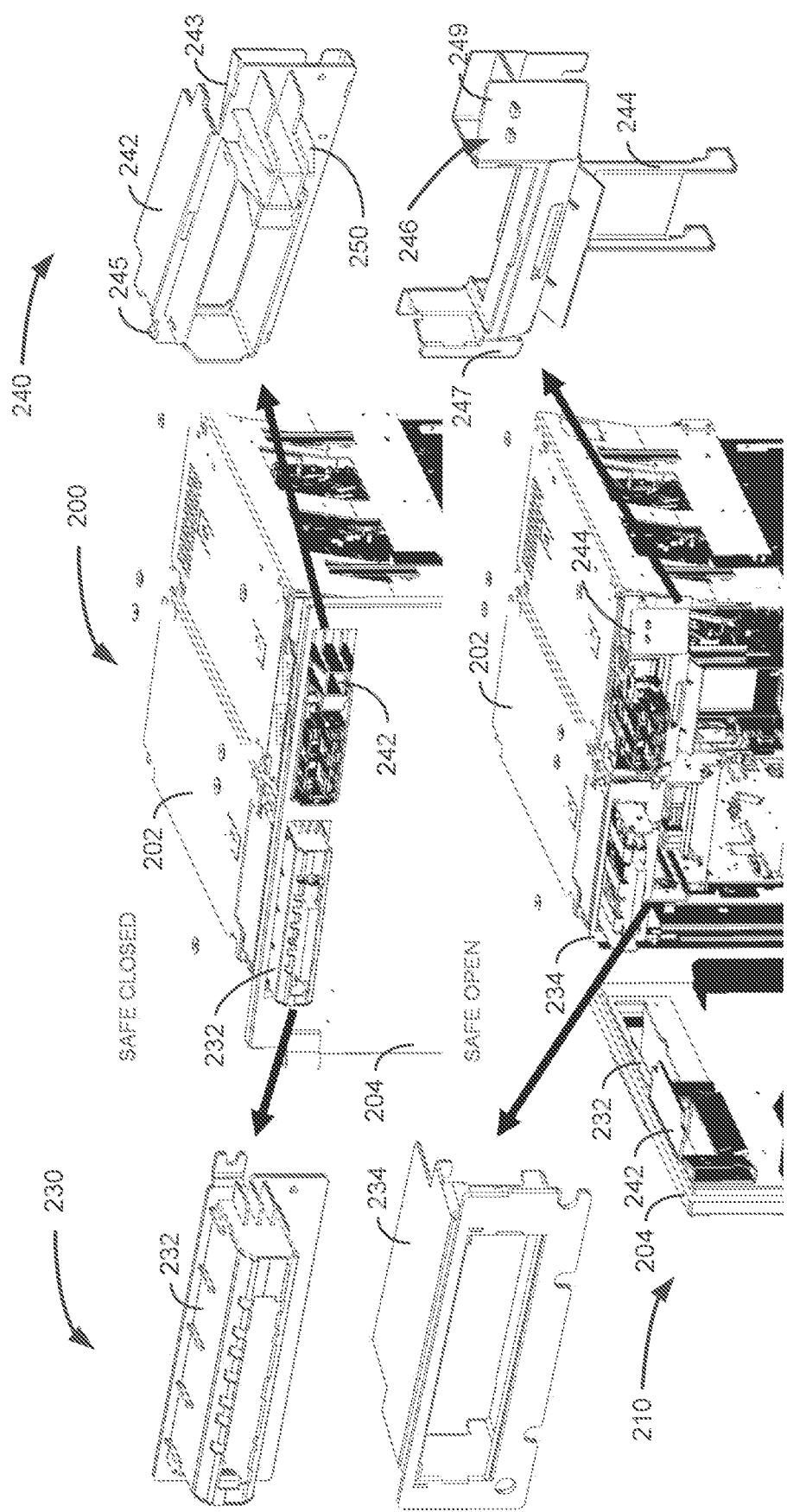
FIG. 2 illustrates a portion of a terminal safe including penetration prevention devices (PPDs), according to an example embodiment.

FIG. 2 illustrates a portion of a terminal safe 202 including PPDs 230, 240 according to an example embodiment. The safe 202 is included in two illustrations 200, 210 of FIG. 2. The safe 202 in illustration 200 includes a safe door 204 in a closed position and two devices extending from inside the safe 202 through the door 204 to the outside of the safe 202. These two devices may generally be a currency dispenser and a currency and document (e.g., check) receiver. The safe 202 in the illustration 210 includes the safe door 204 in an open position. In both illustrations 200, 210, the devices include PPDs 230, 240 installed thereon.

The PPDs 230, 240 both perform the same function, but are adapted to the particular device on and around which they are to perform this function. The function is to mitigate and prevent breaching of the safe 202. This function is accomplished by tire PPDs 230, 240 by reducing and closing gaps between the respective device and the safe door 204. Some embodiments further fill voids between the respective device, the safe door 204, safe 202 walls, and other contents of the safe 202 in areas around and near the device to keep safe 202 breaching implements from penetrating and providing a surface upon which a breaching force may be applied.

For example, the PPD 230 includes two elements 232, 234. The first element 234 attaches to the device inside the safe 202. The second element 232 connects to the safe door 204. When the safe door 204 is closed, the two elements 232, 234 combine to provide closure of gaps between the device and a machine inside the safe 202, such as a currency cartridge picker device. The two elements 232, 234 also fill voids within the safe around the device as it extends toward the safe door 204 in the closed position. The two elements 232, 234 further fill between the device and the hole in the safe door 204 through which the second element 232 and the device protrude.

A further example is the PPD 240 which includes first element 244 and second element 242 that perform the same functions as the first and second elements 234, 232 of the PPD 230. However, the PPD 240 of some embodiments include further features. For example, the PPD 240 includes void filling elements 243, 245, 247, 249. Currency and documents typically flow into and out of a device on a flow path perpendicular to a face of the safe door 204 when closed. Faces of the void filling elements 243, 245, 247, 249, in some embodiments, are at an angle greater than 90 degrees from the flow path. As a result of the angle of these faces, the faces are directed toward the device opening in the terminal and safe housing to that any implements that may still be inserted despite presence of the PPD 240 will have difficulty finding a surface upon which the force will hold the implement. Instead, the implement will have a high likelihood of sliding out without gaining any grip on a surface.

Figure 4:
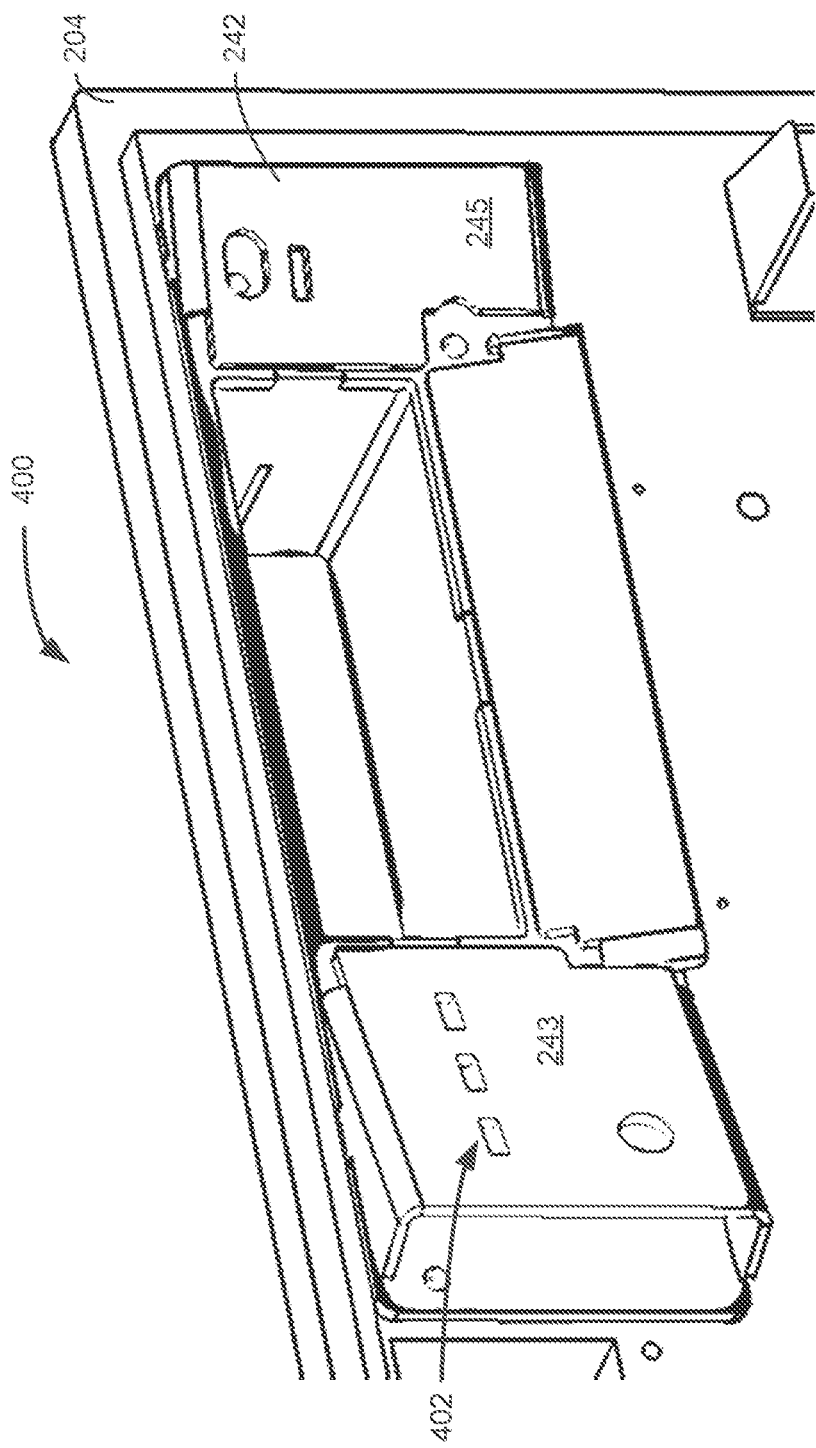
FIG. 4 illustrates a portion of a PPD in a safe door, according to an example embodiment.

However, should an implement still find a point where the implement holds within the safe 202 or terminal housing, the PPD 240 includes a structure 250 of fins or other arrangement of a rigid material such as welded steel or other metal components that collapse toward the respective opening from which force is received. By collapsing toward the respective opening, the collapsing PPD 240 further fills voids and gaps increasing the difficulty of breaching the safe 202. In some such embodiments, surfaces of the void filling elements 243, 245, 247, 249 may include male and female connectors, such as male connector 246 of the void filling element 249 that engages with female connector 402 as illustrated in FIG. 4. Such male and female connectors transfer force received by one element to the other to enable the two components 242, 244 to ensure they are aligned properly when the safe door 204 is close and that they move and deform in concert when a breach attempt is made and breaching force is applied. The structure 250 however may instead receive an inward force when a wedge, hook, or other implement insertion attempt is made. In such instances, the structure 250 may instead collapse away from the opening, but other portions of the second element 242 will be pulled and collapse toward opening where the inward force is received.

Figure 3:
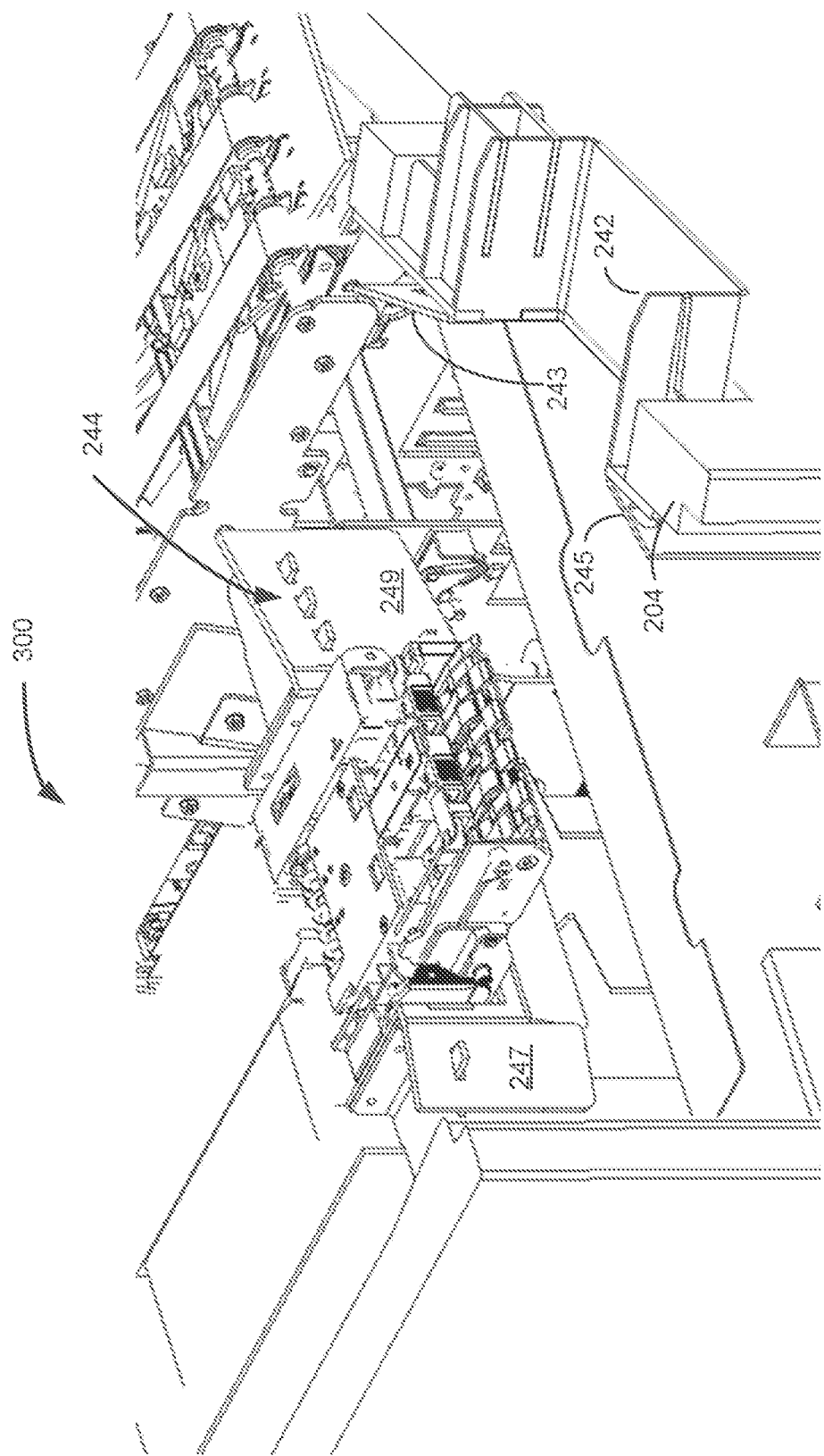
FIG. 3 illustrates a portion of a terminal safe including a PPD, according to an example embodiment.

FIG. 3 illustrates a portion of a terminal safe 202 including a PPD 240, according to an example embodiment. The illustration 300 includes the same PPD 240 as illustrated in FIG. 2, but from a different perspective.

FIG. 4 illustrates a portion of a PPD 240 in a safe door 204, according to an example embodiment. The illustration 400 includes the same PPD 240 as illustrated in FIG. 2 and FIG. 3, but from a different perspective.

Figure 5:
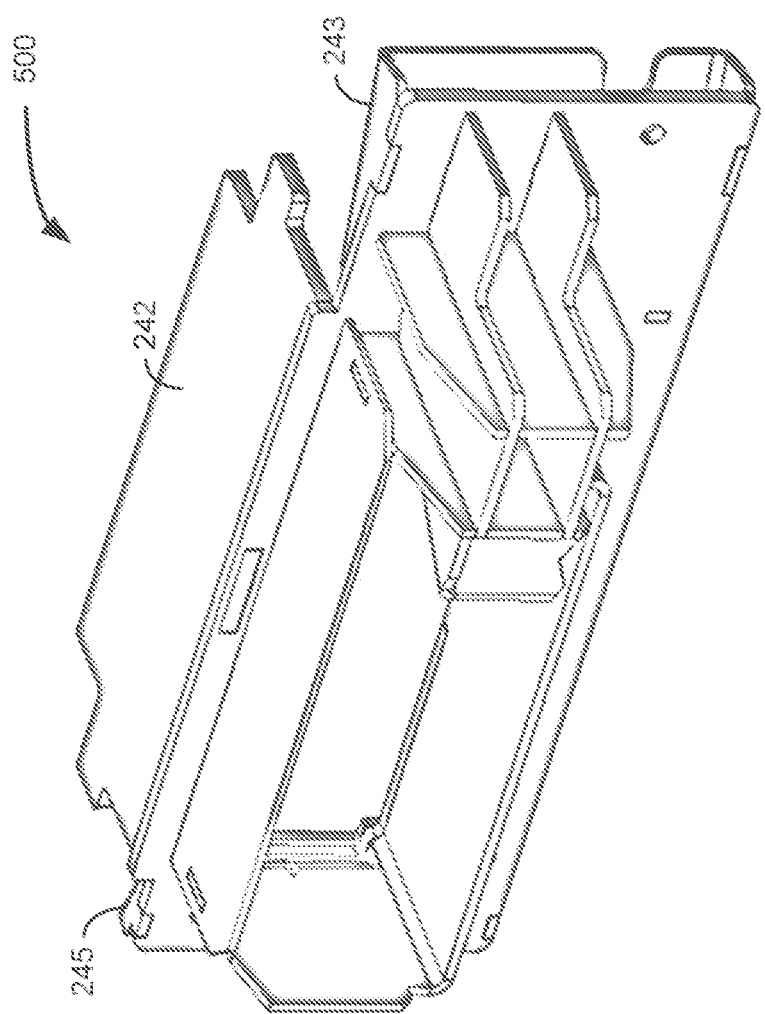
FIG. 5 illustrates a portion of a PPD, according to an example embodiment.

FIG. 5 illustrates a portion of a PPD 240, according to an example embodiment. The illustration 500 is of the second element 242 of the PPD 240 of FIG. 2, FIG. 3, and FIG. 4, but with greater detail.

Figure 6:
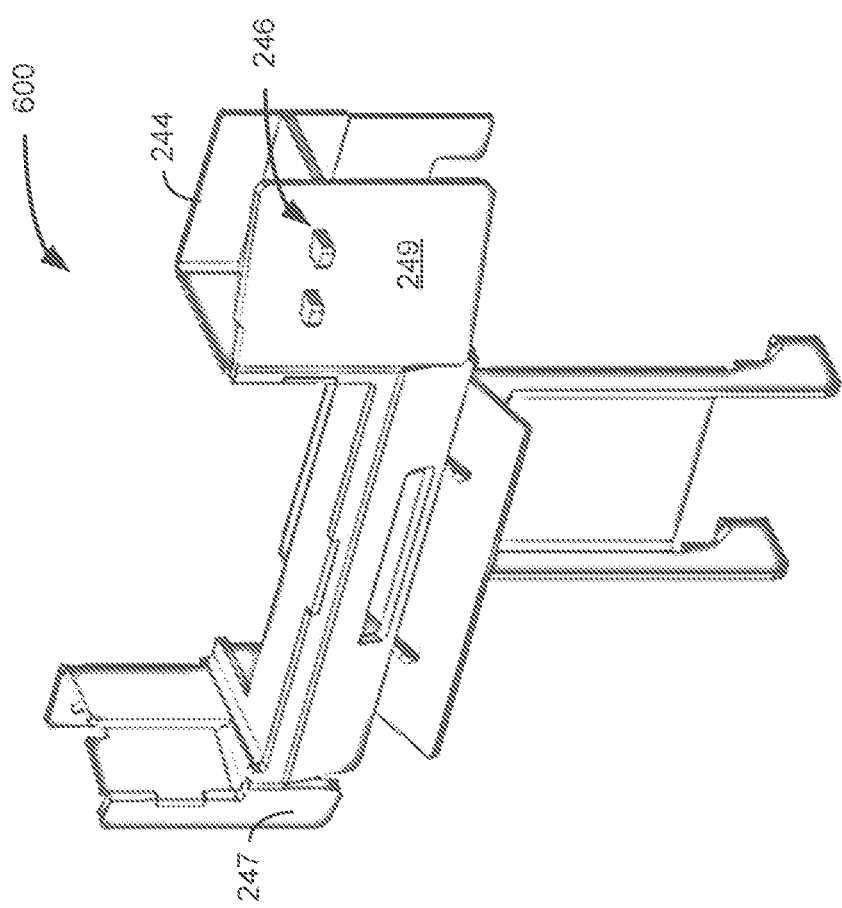
FIG. 6 illustrates a portion of a PPD, according to an example embodiment.

FIG. 6 illustrates a portion of a PPD, according to an example embodiment. The illustration 600 is of the second element 244 of the PPD 240 of FIG. 2, FIG. 3, and FIG. 4, but with greater detail.

Figure 7:
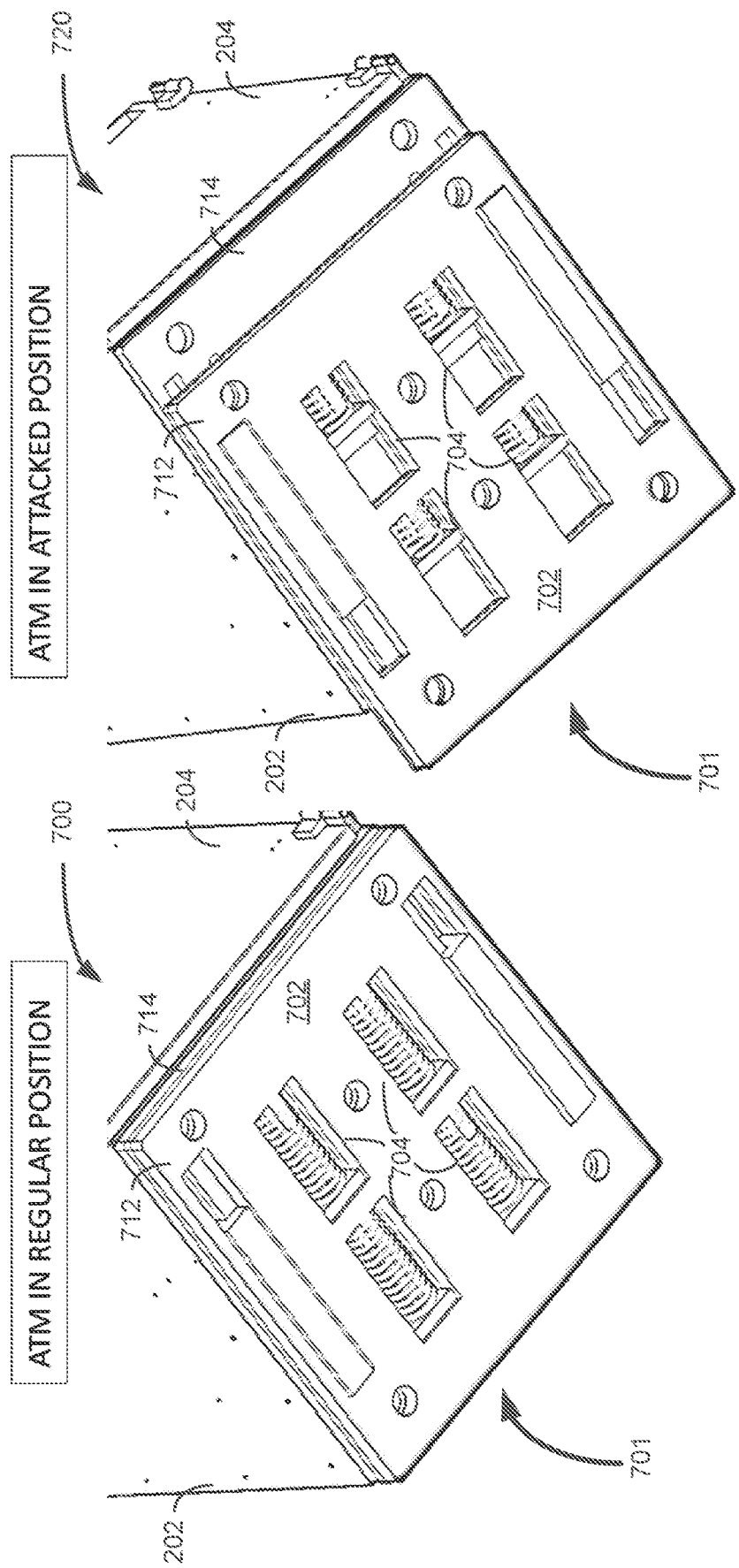
FIG. 7 illustrates a terminal baseplate assembly, according to an example embodiment.

FIG. 7 illustrates a terminal baseplate assembly 701, according to an example embodiment. FIG. 7 includes two illustrations of tire baseplate assembly 701, an illustration 700 of the baseplate assembly 701 in a regular position and an illustration 720 of the baseplate assembly in an attacked position.

The baseplate assembly includes a top plate 714 and a bottom plate 712. Details of the top plate 714 are included in the top plate illustration 820 of FIG. 8 and details of the bottom plate 712 are included in the bottom plate illustration 830, also of FIG. 8.

Figure 8:
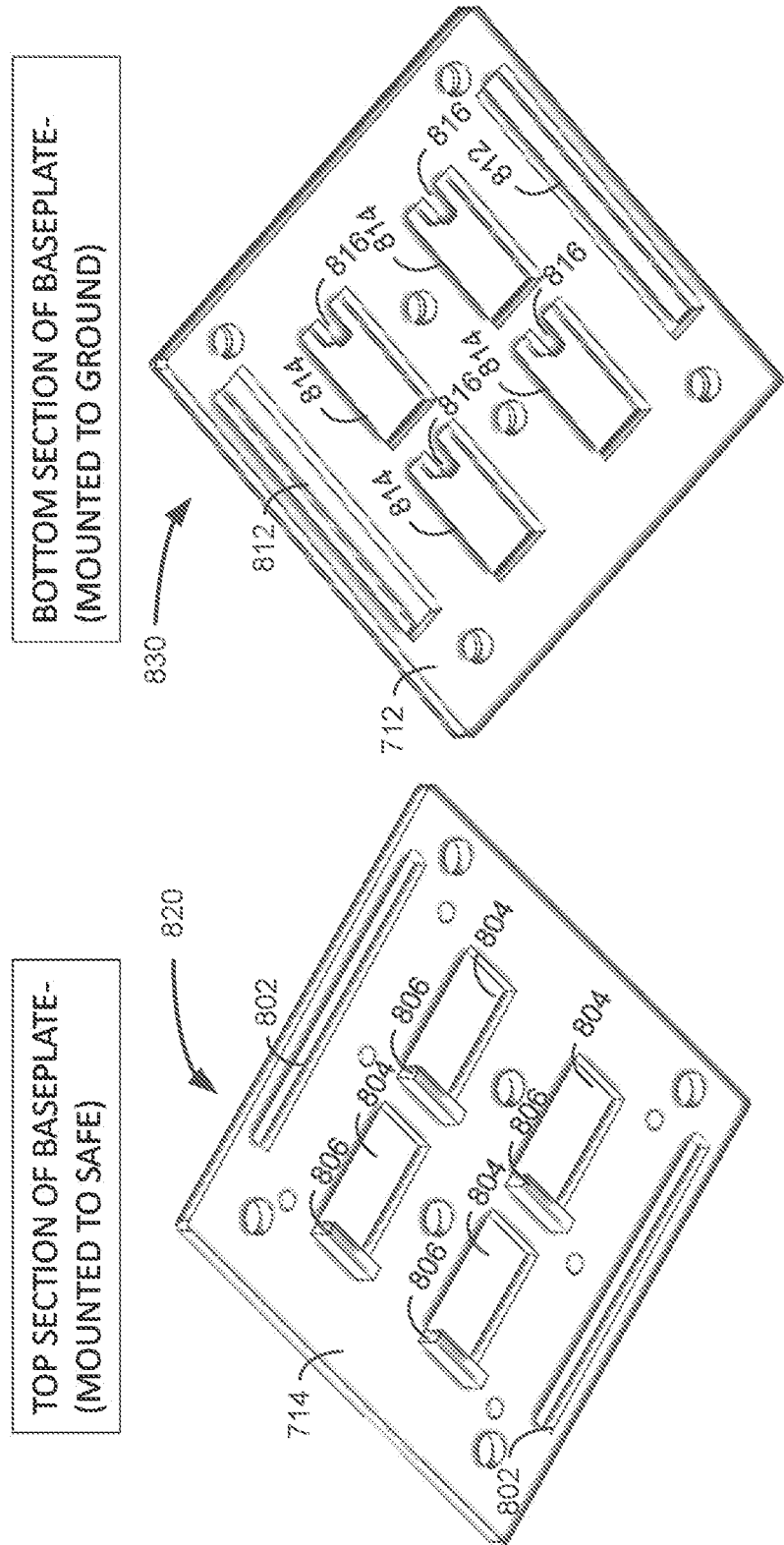
FIG. 8 illustrates a top plate and a bottom plate of a terminal baseplate assembly, according to an example embodiment.

FIG. 8 illustrates a top plate 714 and a bottom plate 712 of a terminal baseplate assembly 701, according to an example embodiment.

Beginning with the illustration 700 of the baseplate assembly 701 in a regular position, the baseplate assembly 701 includes a top plate 714 mountable to a terminal bottom, such as the bottom of a safe 202.

Figure 9:
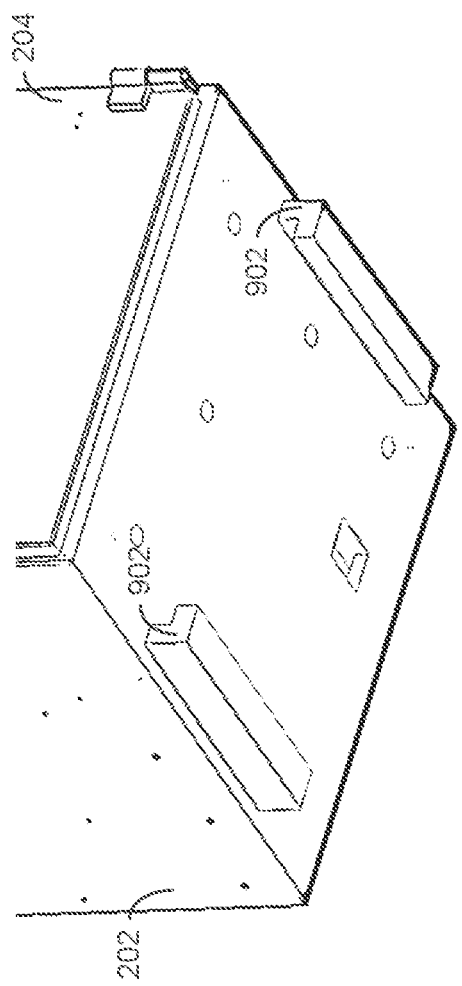
FIG. 9 illustrates a terminal base, according to an example embodiment.

Turning now to the top plate illustration 820 of FIG. 8, the top plate 714, in some embodiments, includes a first pair of parallel latitudinal channels 802 through which rails 902 as illustrated in FIG. 9, on a terminal or safe 202 bottom extend when mounted thereon. Each of these channels 802 is typically sized to engage with a respective rail 902 to restrict, or contain, latitudinal movement between the top plate and a terminal bottom. The top plate 714 further includes at least one upper movement restricting device void 804 extending parallel with the first pair of parallel latitudinal channels and sized to hold a movement restriction device 704 of FIG. 7 biased against an upper mount 806 that extends downward from and longitudinally across the top plate 714 to receive a biasing force of a movement restriction device.

A bottom plate 712, in some embodiments, is mountable to a surface where a terminal is to be located. The bottom plate 712 typically includes a second pair of parallel latitudinal channels 812 through which the rails 902 on the terminal bottom or safe 202 extend. the second pair of parallel channels 812 are sized to allow latitudinal movement between the bottom plate 712 and the top plate 714 mounted to the terminal or safe 202 bottom. The bottom plate 712 also typically includes at least one lower movement restricting device void 814 extending parallel with the second pair of parallel latitudinal channels 812, sized to hold a movement restriction device 704 biased against a lower mount 816 that extends receive the biasing force of a movement restriction device 704. When the bottom plate 712 is joined with the top plate 714, each of the at least one lower movement restriction device voids 814 aligns with a respective upper movement restriction device void 804.

Returning to FIG. 7 and the illustration 700 of the baseplate assembly 701 in the regular position, a movement restriction device 704 is deployed longitudinally within each pair of aligned upper and lower movement restriction device voids 804, 814 of the top and bottom plates 714, 712. Each movement restriction device 704, when inserted into the voids 804, 814 is biased between the upper and lower mounts 806, 816 to absorb and restrict longitudinal movement of the top plate 714. An example of such longitudinal movement of the top plate 714 is included in the illustration 720 of the ATM in the attacked position. Such movement may be caused by a hook-and-chain breaching attempt, by being struck by a vehicle, such as a car or snowplow, or other force. Regardless, when the force is applied, the bottom plate 712, when bolted to a surface such as a concrete slab, remains stationary while the top plate 714, and the terminal and safe 202 bolted thereto, slide in the direction of the force. The movement restriction devices) 704 dampen the force by absorbing at least a portion of the energy with springs, hydraulic or air shock absorbers, rubber bushings, sacrificial material that collapses to absorb the force, or a combination of these or other such devices. Such dampening is achieved by reducing the peak force applied to the terminal during a breaching attempt. More particularly, by distributing the force applied over a longer period of time or across a broader, non point location, through the dampening effect of the movement restriction device, such as springs. By absorbing at least some of the energy and allowing restricted movement, the likelihood of success of a safe breaching attack of a terminal is greatly reduced. Additionally, protection from a vehicle collision, whether intentional or accidental, is also provided.

FIG. 9 illustrates a terminal base, according to an example embodiment. FIG. 9 includes an example illustration of the rails 902 as discussed above. The rails 902 may be fabricated to the bottom of a terminal or safe in some embodiments. In other embodiments, the rails 902 may be bolted to the bottom of a terminal or safe.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A terminal comprising:
   a housing with an opening through which a device is exposed to an outside of the housing;
   a safe internal to the housing;
   the device partially internal to the safe, extending outward therefrom, and exposed through the housing opening to perform at least one of dispensing items from the safe outside of the housing and receiving items from outside the housing and into the safe; and
   at least one penetration prevention device (PPD) comprising air shocks that reduce transmission of breaching forces to the safe, wherein the PPD is formed of a rigid material formed about the device that is exposed to the outside of the housing and an inward side of the housing about the opening to reduce gaps between the device and boundaries of the opening, wherein the PPD includes fins adapted to collapse toward the opening when force is applied to fill the gaps, wherein the fins or other arrangement of a rigid material collapse toward a respective opening from which force is received, wherein the PPD includes male connectors that correspond to female connectors of a portion of a safe door, the male and female connectors adapted to move and to deform in concert when a breach attempt is made, and a breaching force is applied when the safe door is closed, wherein the PPD further includes elements that interlock first and second pieces such that a force applied against one piece transfers the force to at least in part to the other piece, ensuring alignment of the first and second pieces.

2. The terminal of claim 1, wherein the at least one PPD extends outward from the device within the housing to fill a void around the device within the housing.

3. The terminal of claim 2, wherein the at least one PPD is a multi-piece PPD including:
   a first piece that attaches to the opening inside the housing; and
   a second piece that attaches inside the safe around the device.

4. The terminal of claim 3, wherein:
   the safe includes the safe door;
   the device extends outward from the safe door of the safe;
   the housing includes a housing door; and the opening exposes the device through the housing door of the housing.

5. The terminal of claim 4, wherein the safe door and the housing door open independently of one another.

6. The terminal of claim 5, wherein the first piece of the PPD attached to the inside of the housing is attached inside the housing door and includes at least one element that physically engages with a respective element of the second piece of the PPD attached inside the safe around the device.

7. The terminal of claim 6, wherein:
the device performs the at least one of the dispensing and receiving of items on a linear path that is perpendicular to a surface of the device that is furthest outside of the safe; and
surfaces of the first and second pieces that face when the housing door is closed are angled greater than 90 degrees from the linear path measured from the surface of the device that is furthest outside of the safe.

8. The terminal of claim 1, further comprising:
a baseplate assembly attached to a bottom of the terminal that is attachable to a surface where the terminal is to be deployed, the baseplate assembly including a top portion that interlocks with a bottom portion such that the top portion and bottom portion slidably engage on a linear path with the sliding limited on the linear path by at least one movement restricting device, the linear path perpendicular to a surface of the safe that opens.

9. The terminal of claim 8, wherein the at least one movement restricting device includes a spring.

10. A penetration prevention device (PPD) for placement around a device partially internal to a safe of a terminal and extending outward from the safe and exposed through an opening in a housing of the terminal, the PPD comprising:
a first piece to attach to the housing opening;
a second piece that attaches inside the safe around the device;
air shocks that reduce transmission of breaching forces to the safe;
fins; and
the first and second pieces fitting together allowing access to the device and filling areas around the device accessible through the housing opening, from an inner surface of the housing to an outer surface of the safe, to prevent entry of foreign objects within the housing and the safe, wherein the fins are adapted to collapse toward housing opening when force is applied to fill gaps, wherein the fins comprise a structure of fins or other arrangement of a rigid material that collapse toward a respective opening from which force is received, wherein the PPD includes male connectors that correspond to female connectors of a portion of a door of the safe, the male and female connectors adapted to move and to deform in concert when a breach attempt is made, and a breaching force is applied when the safe door closed, wherein the PPD further includes elements that interlock the first and second pieces such that a force applied against one transfers the force at least in part to the other, ensuring alignment of the first and second pieces.

11. The terminal PPD of claim 10, wherein the at least one of the first and second pieces is made of steel.

12. The terminal PPD of claim 10, wherein:
the safe includes the door through which the device extends;
the housing includes a door within which is the opening that exposes the device;
the first piece attaches inside the door and includes at least one element that physically engages with a respective element of the second piece; and
the second piece attaches inside the safe around the device.

13. The terminal PPD of claim 12, wherein:
the device performs the at least one of the dispensing and receiving of items on a linear path that is perpendicular to a surface of the device that is furthest outside of the safe; and
surfaces of the first and second pieces that face when the housing door is closed are angled greater than 90 degrees from the linear path measured from the surface of the device that is furthest outside of the safe.

14. The terminal PPD of claim 10 wherein the first and second pieces include elements that interlock the pieces such that a force applied against one transfers the force at least in part to the other.

15. The terminal PPD of claim 14, wherein at least a portion of the first and second pieces, when a force is applied thereto, collapses to further obstruct the opening in the housing.

* * * * *